US009117302B2

(12) United States Patent
Seetharamaiah et al.

(10) Patent No.: US 9,117,302 B2
(45) Date of Patent: Aug. 25, 2015

(54) SWITCHING BETWEEN DIRECT RENDERING AND BINNING IN GRAPHICS PROCESSING USING AN OVERDRAW TRACKER

(75) Inventors: Avinash Seetharamaiah, Chuluota, FL (US); Christopher Paul Frascati, Oviedo, FL (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 13/553,673

(22) Filed: Jul. 19, 2012

(65) Prior Publication Data
US 2013/0135322 A1 May 30, 2013

Related U.S. Application Data

(60) Provisional application No. 61/565,397, filed on Nov. 30, 2011.

(51) Int. Cl.
*G06T 1/00* (2006.01)
*G06T 15/00* (2011.01)
*G06T 1/20* (2006.01)

(52) U.S. Cl.
CPC .................................. *G06T 15/005* (2013.01)

(58) Field of Classification Search
CPC ....... G06F 17/00–17/608; G06T 1/00–1/0092; G06T 15/00–15/005; G06T 15/40–15/405; G09G 5/00–5/008
USPC .................................. 345/418, 419, 422, 620
See application file for complete search history.

(56) References Cited

U.S. PATENT DOCUMENTS

| 5,793,385 A | 8/1998 | Nale |
| 6,208,361 B1 | 3/2001 | Gossett |
| 6,321,314 B1 | 11/2001 | Van Dyke |
| 6,466,217 B1 | 10/2002 | Hsieh et al. |
| 6,560,657 B1 | 5/2003 | Gandhi et al. |
| 6,954,208 B2 | 10/2005 | Doyle et al. |
| 7,170,513 B1 | 1/2007 | Voorhies et al. |
| 7,411,591 B2 | 8/2008 | Kulkarni |
| 7,545,382 B1 | 6/2009 | Montrym et al. |

(Continued)

FOREIGN PATENT DOCUMENTS

EP 2261862 A1 12/2010

OTHER PUBLICATIONS

Cox, M. & Bhandari, N., "Architectural Implications of Hardware-Accelerated Bucket Rendering on the PC," (Association for Computing Machinery SIGGRAPH/Eurographics Workshop 1997), pp. 25-34, 10 pp.

(Continued)

*Primary Examiner* — Jacinta M Crawford
(74) *Attorney, Agent, or Firm* — Shumaker & Sieffert, P.A.

(57) ABSTRACT

This disclosure presents techniques and structures for determining a rendering mode (e.g., a binning rendering mode and a direct rendering mode) as well as techniques and structures for switching between such rendering modes. Rendering mode may be determined by analyzing rendering characteristics. Rendering mode may also be determined by tracking overdraw in a bin. The rendering mode may be switched from a binning rendering mode to a direct rendering mode by patching commands that use graphics memory addresses to use system memory addresses. Patching may be handled by a CPU or by a second write command buffer executable by a GPU.

28 Claims, 16 Drawing Sheets

(56) References Cited

U.S. PATENT DOCUMENTS

| | | |
|---|---|---|
| 7,586,500 B2 | 9/2009 | Herceg et al. |
| 7,830,381 B2 | 11/2010 | Lundstrom et al. |
| 7,944,441 B2 | 5/2011 | Van Hook et al. |
| 8,004,521 B2 | 8/2011 | Falchetto |
| 8,026,912 B1 | 9/2011 | Danskin |
| 2004/0075654 A1 | 4/2004 | Hsiao et al. |
| 2005/0057571 A1 | 3/2005 | Stevens |
| 2006/0256112 A1 | 11/2006 | Heirich et al. |
| 2007/0132770 A1 | 6/2007 | Stefanidis et al. |
| 2008/0100627 A1 | 5/2008 | Nystad et al. |
| 2008/0170066 A1* | 7/2008 | Falchetto ............... 345/419 |
| 2008/0273031 A1 | 11/2008 | Shao et al. |
| 2009/0087096 A1 | 4/2009 | Eaton et al. |
| 2009/0122068 A1 | 5/2009 | Garritsen |
| 2010/0007662 A1* | 1/2010 | Cox et al. ............... 345/420 |
| 2010/0118039 A1 | 5/2010 | Labour |
| 2010/0265254 A1 | 10/2010 | Liland et al. |
| 2011/0084964 A1 | 4/2011 | Gould et al. |
| 2012/0293519 A1* | 11/2012 | Ribble et al. ............. 345/501 |
| 2013/0135329 A1 | 5/2013 | Seetharamaiah et al. |
| 2013/0135341 A1 | 5/2013 | Seetharamaiah et al. |

OTHER PUBLICATIONS

International Search Report and Written Opinion—PCT/US2012/063945—ISA/EPO—March 20, 2013, 11 pp.

Antochi I et al., "Memory Bandwidth Requirements of Tile-Based Rendering", Computer systems: Architectures, Modeling, and Simulation, Third and Fourth International Workshops, SAMOS 2003 and SAMOS 2004, Proceddings—Jul. 21-23, 2003 & Jul. 19-21, 2004—Samos, Greece (IN: Lecture Notes in Computer Sciences),, vol. 3133, Jan. 1, 2004, pp. 323-332, XP009126264, 10 pp.

Mokhoff, Nicolas. "IP cores for mobile apps set for OpenGL," Electronic Engineering Times 1383: 34, (Aug. 8, 2005).

U.S. Appl. No. 13/553,624, by Avinash Seetharamaiah, filed Jul. 19, 2012.

U.S. Appl. No. 13/553,709, by Avinash Seetharamaiah, filed Jul. 19, 2012.

Falchetto et al., "Sort Middle Pipeline Architecture for Efficient 3D Rendering," Consumer Electronics, 2007. ICCE 2007. Digest of Technical Papers. International Conference, Jan. 2007, 2 pp.

\* cited by examiner

US 9,117,302 B2

1

SWITCHING BETWEEN DIRECT RENDERING AND BINNING IN GRAPHICS PROCESSING USING AN OVERDRAW TRACKER

This application claims the benefit of U.S. Provisional Application No. 61/565,397, filed Nov. 30, 2011, which is hereby incorporated by reference in its entirety.

TECHNICAL FIELD

This disclosure relates to techniques for graphics processing, and more specifically to techniques for switching between direct rendering and binning in graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system.

SUMMARY

In general, this disclosure describes techniques for switching between direct rendering and binning in graphics processing, and techniques for determining a rendering mode.

In one example of the disclosure, a method of graphics processing comprises generating rendering commands for rendering a frame, wherein the rendering commands are for a binning rendering mode, tracking the rendering commands that use graphics memory addresses, determining one of a plurality of rendering modes for the frame based on rendering characteristics, wherein the plurality of rendering modes includes the binning rendering mode and a direct rendering mode, and altering the rendering commands that use graphics memory addresses to use system memory addresses in the case that the determined rendering mode is a direct rendering mode.

In another example of the disclosure, a method of graphics processing comprises performing a binning operation on primitives of a scene, wherein the primitives are divided into bins, calculating an overdraw number representing an amount of overdraw of primitives in a region of the scene, and determining a rendering mode based on the calculated score.

In another example of the disclosure, a method of graphics processing comprises storing operation commands for executing a graphics operation in a first buffer, and storing write commands in a second buffer, wherein the write commands, when executed, alter the operation commands in the first buffer to create altered operation commands.

The techniques of this disclosure are also described in terms of an apparatus and a computer-readable storage medium storing instructions for causing a processor to perform the techniques. The details of one or more examples are set forth in the accompanying drawings and the description below. Other features, objects, and advantages will be apparent from the description and drawings, and from the claims.

DETAILED DESCRIPTION

This disclosure relates to techniques for graphics processing, and more specifically to techniques for determining a rendering mode and switching between rendering modes in a graphics processing system.

Current graphics rendering systems typically utilize a binning rendering mode (sometimes called tile-based rendering) or a direct rendering mode to render a scene. In binning rendering, one frame of a 2D or 3D scene is rendered by breaking the frame into smaller parts (e.g., rectangular bins or tiles) and rendering each of these bins separately. Binning rendering is useful for applications where little dedicated fast graphics memory (GMEM) is available, such as for mobile applications. The size of the tiles can be configured to represent the amount of data that is available in the GMEM. For example, if the GMEM is able to store 512 kB, the size of a tile may be configured so that that pixel data contained in that tile is less than or equal to 512 kB.

Graphics processing in a direct rendering mode, on the other hand, does not break a frame into smaller bins. Instead, the entirety of a frame is rendered at once. In some graphics processing systems (e.g., a graphics processing system on a mobile device), there is not enough GMEM to hold an entire frame of pixel data. Instead, for a direct rendering mode, slower system memory is used to render the frame.

This disclosure presents techniques and structures for determining a rendering mode (e.g., a binning rendering mode and a direct rendering mode) as well as techniques and structures for switching between such rendering modes.

In one example of the disclosure, a method of graphics processing comprises generating rendering commands for rendering a frame, wherein the rendering commands are for a binning rendering mode, tracking the rendering commands that use graphics memory addresses, determining one of a plurality of rendering modes for the frame based on rendering characteristics, wherein the plurality of rendering modes includes the binning rendering mode and a direct rendering mode, and altering the rendering commands that use graphics memory addresses to use system memory addresses in the case that the determined rendering mode is a direct rendering mode.

In another example of the disclosure, a method of graphics processing comprises performing a binning operation on primitives of a scene, wherein the primitives are divided into bins, calculating an overdraw number representing an amount of overdraw of primitives in a region of the scene, and determining a rendering mode based on the calculated score.

In another example of the disclosure, a method of graphics processing comprises storing operation commands for executing a graphics operation in a first buffer, and storing write commands in a second buffer, wherein the write commands alter the operation commands in the first buffer to create altered operation commands.

Figure 1:
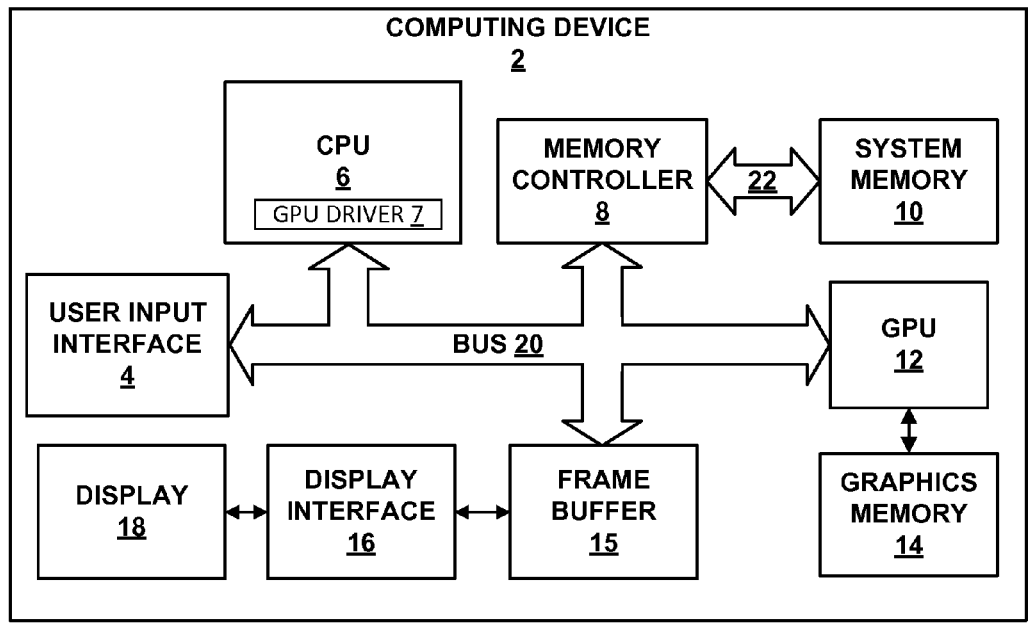
FIG. 1 is a block diagram showing an example computing device configured to use the techniques of this disclosure.

FIG. 1 is a block diagram illustrating an example computing device 2 that may be used to implement the techniques of this disclosure for determining a rendering mode and switching between rendering modes (e.g., between a binning rendering mode and a direct rendering mode). Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, a memory controller 8, a system memory 10, a graphics processing unit (GPU) 12, a graphics memory 14, a display interface 16, a display 18 and buses 20 and 22. Note that in some examples, graphics memory 14 may be "on-chip" with GPU 12. In some cases, all hardware elements show in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be is allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

According to one example of the disclosure, CPU 6 and/or GPU driver 7 may be configured to generate rendering commands for rendering a frame, wherein the rendering commands are for a binning rendering mode, track the rendering commands that use graphics memory addresses, determine one of a plurality of rendering modes for the frame based on rendering characteristics, wherein the plurality of rendering modes includes the binning rendering mode and a direct rendering mode, and alter the rendering commands that use graphics memory addresses to use system memory addresses in the case that the determined rendering mode is a direct rendering mode.

According to another example of the disclosure, CPU 6 and/or graphics driver 7 may be configured to perform a binning operation on primitives of a scene, wherein the primitives are divided into bins, calculate an overdraw number representing an amount of overdraw of primitives in a region of the scene, and determine a rendering mode based on the calculated score.

According to another example of the disclosure, CPU 6 and/or graphics driver 7 may be configured to store operation commands for executing a graphics operation in a first buffer, and store write commands in a second buffer, wherein the write commands alter the operation commands in the first buffer to create altered operation commands.

Figure 2:
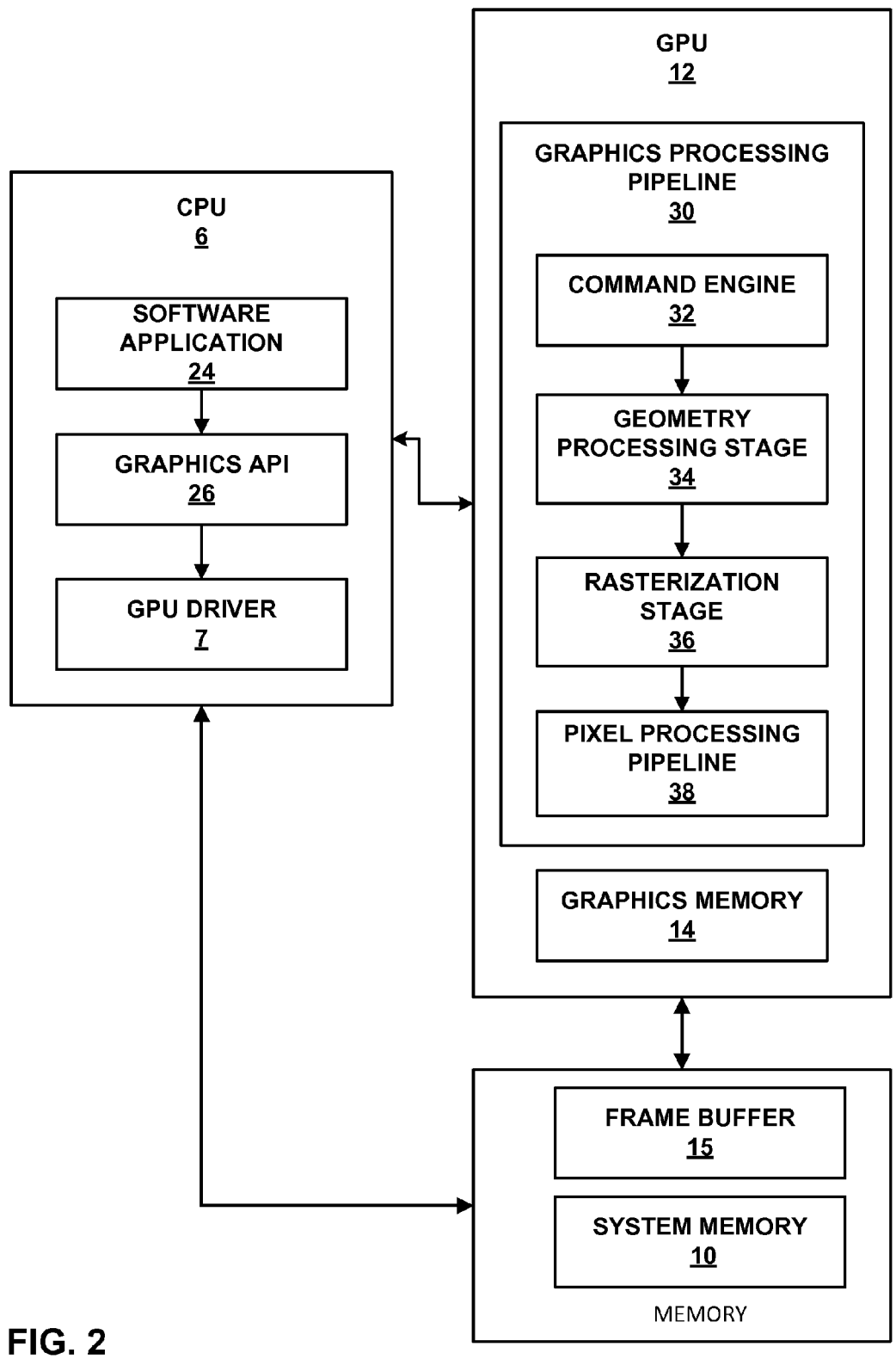
FIG. 2 is a block diagram showing an example processing units configured to use the techniques of this disclosure.

FIG. 2 is a block diagram illustrating example implementations of CPU 6, GPU 12, and system memory 10 of FIG. 1 in further detail. CPU 6 may include at least one software application 24, a graphics API 26, and a GPU driver 7, each of which may be one or more software applications or services that execute on CPU 6. GPU 12 may include a graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 40 associated with a display device. Graphics pipeline 30 may be configured to execute in one of a plurality of different rendering modes, including a binning rendering mode and a direct rendering mode. The operation of the binning rendering mode and the direct rendering mode will be discussed in more detail below.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some example embodiments of this disclosure, a pixel shader program may also include instructions that selectively cause texture values to be retrieved for source pixels based on corresponding destination alpha values for the source pixels.

According to techniques of this disclosure, GPU driver 7 may also be configured to track commands generated for rendering in a binning rendering mode that utilize GMEM addresses. For each command that utilizes a GMEM address, GPU driver 7 may store a corresponding system memory address that would be used for a direct rendering mode. If the rendering mode is switched from the binning rendering mode to the direct rendering mode, GPU driver 7 may patch (i.e., alter) the rendering commands to replace the GMEM addresses with system memory addresses. Additional techniques for patching GMEM addresses with system memory addresses will be discussed in more detail below.

Graphics processing pipeline 30 may be configured to receive one or more graphics processing commands from CPU 6, via graphics driver 28, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

As discussed above, graphics processing pipeline 30 may render a graphics image according to a particular rendering mode, including a binning rendering mode and a direct rendering mode. When rendering according to a binning rendering mode, graphics processing pipeline 30 may receive a batch of primitives (i.e., one or more primitives) to render into a resulting graphics image. To render the batch of primitives, the resulting graphics image may be subdivided into a plurality of smaller portions (e.g., tiles of pixels or bins), and graphics processing pipeline 30 may render each portion of the graphics image as a separate rendering pass.

Figure 3:
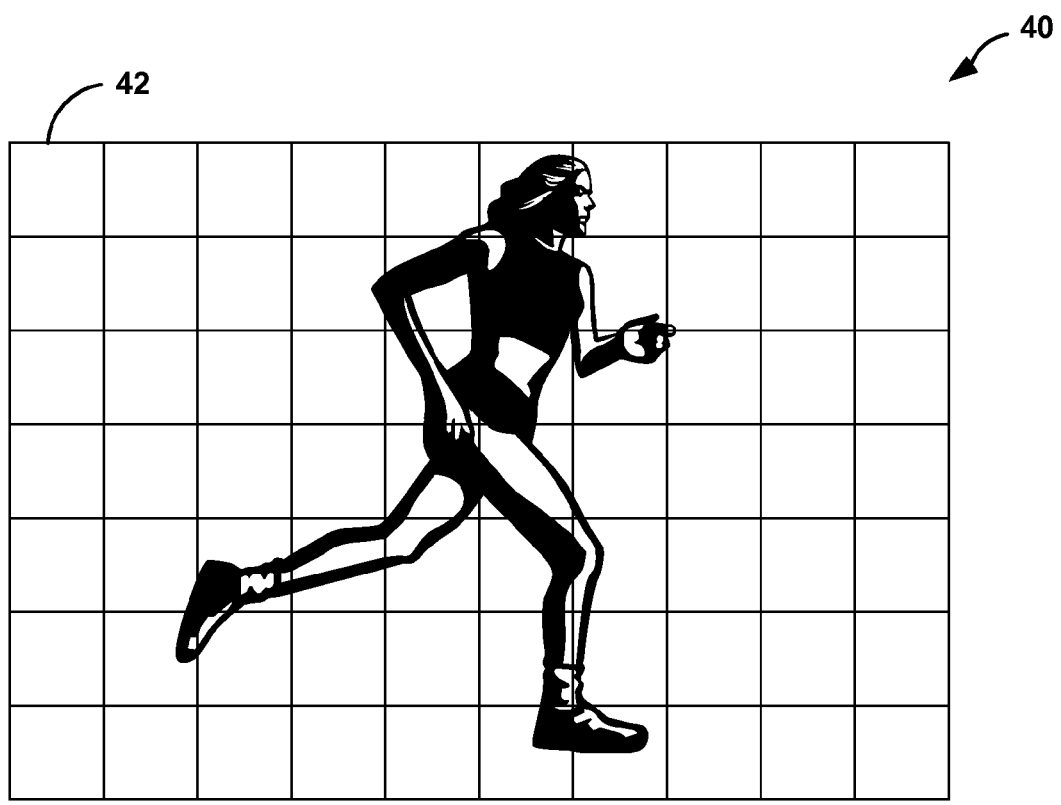
FIG. 3 is a conceptual diagram illustrating bins of a frame as used in a binning rendering mode.

FIG. 3 is a conceptual diagram illustrating a frame divided into bins for binning rendering mode. Frame 40 may be divided into a plurality of bins, such as bin 42. Typically, the graphics hardware will contain fast memory (e.g., graphics memory 14 of FIG. 2) that is of a size sufficient to hold at least one bin of data. As part of a single rendering pass for a particular portion of the frame, graphics processing pipeline 30 may render all or a subset of the batch of primitives with respect to a particular subset of the destination pixels (e.g., a particular bin of destination pixels) of the frame. After performing a first rendering pass with respect to a first bin, graphics processing pipeline 30 may perform a second rendering pass with respect to a second bin, and etc. Graphics processing pipeline 30 may incrementally traverse through the bins until the primitives associated with every bin have been rendered.

Figure 4:
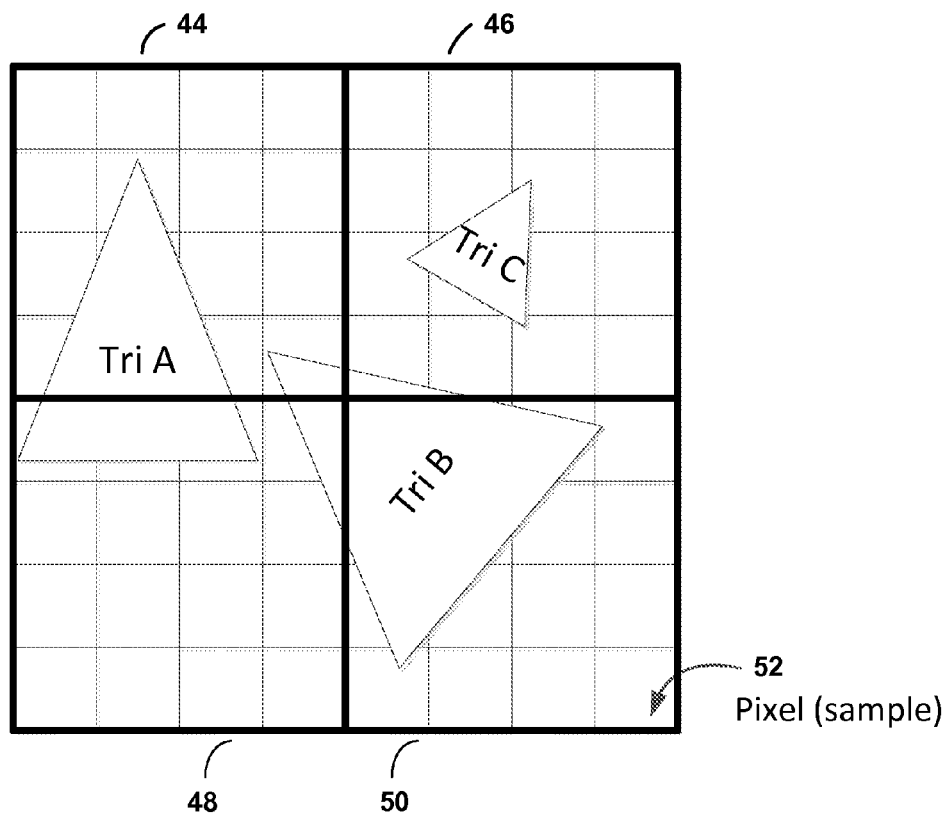
FIG. 4 is a conceptual diagram illustrating bins of a frame in more detail as used in a binning rendering mode.

FIG. 4 is a conceptual diagram showing bins used in a binning rendering mode in more detail. Bins 44, 46, 48 and 50 are rendered/rasterized to contain multiple pixels 52. One or more graphics primitives may be visible in each bin. For example, portions of triangle A (Tri A) are visible in both bin 44 and bin 48. Portions of triangle B (Tri B) are visible in each of bin 44, bin 46, bin 48, and bin 50. Triangle C (Tri C) is only visible in bin 46. During a rendering pass, in one example of a binning rendering mode, a scene is split into bins and all triangles that are in the bin are rendered (this is sometimes called software binning) In another example of a binning rendering mode, an additional step is taken before rendering to determine which triangles in the bin are actually visible in the final rendered scene (this is sometimes called hardware binning) For example, some triangles may be behind one or more other triangles and will not be visible in the final rendered scene. In this way, triangles that are not visible need not be rendered for that bin.

While performing a particular rendering pass, the pixel data for the bin associated with that particular rendering pass may be stored in a graphics memory 14 (sometimes called a bin buffer). After performing the rendering pass, graphics processing pipeline 30 may transfer the contents of graphics memory 14 to frame buffer 15. In some cases, graphics processing pipeline 30 may overwrite a portion of the data in frame buffer 15 with the data stored in graphics memory 14.

In other cases, graphics processing pipeline 30 may composite or combine the data in frame buffer 15 with the data stored in graphics memory 14. After transferring the contents of graphics memory 14 to frame buffer 15, graphics processing pipeline 30 may initialize graphics memory 14 to default values and begin a subsequent rendering pass with respect to a different bin.

Figure 5:
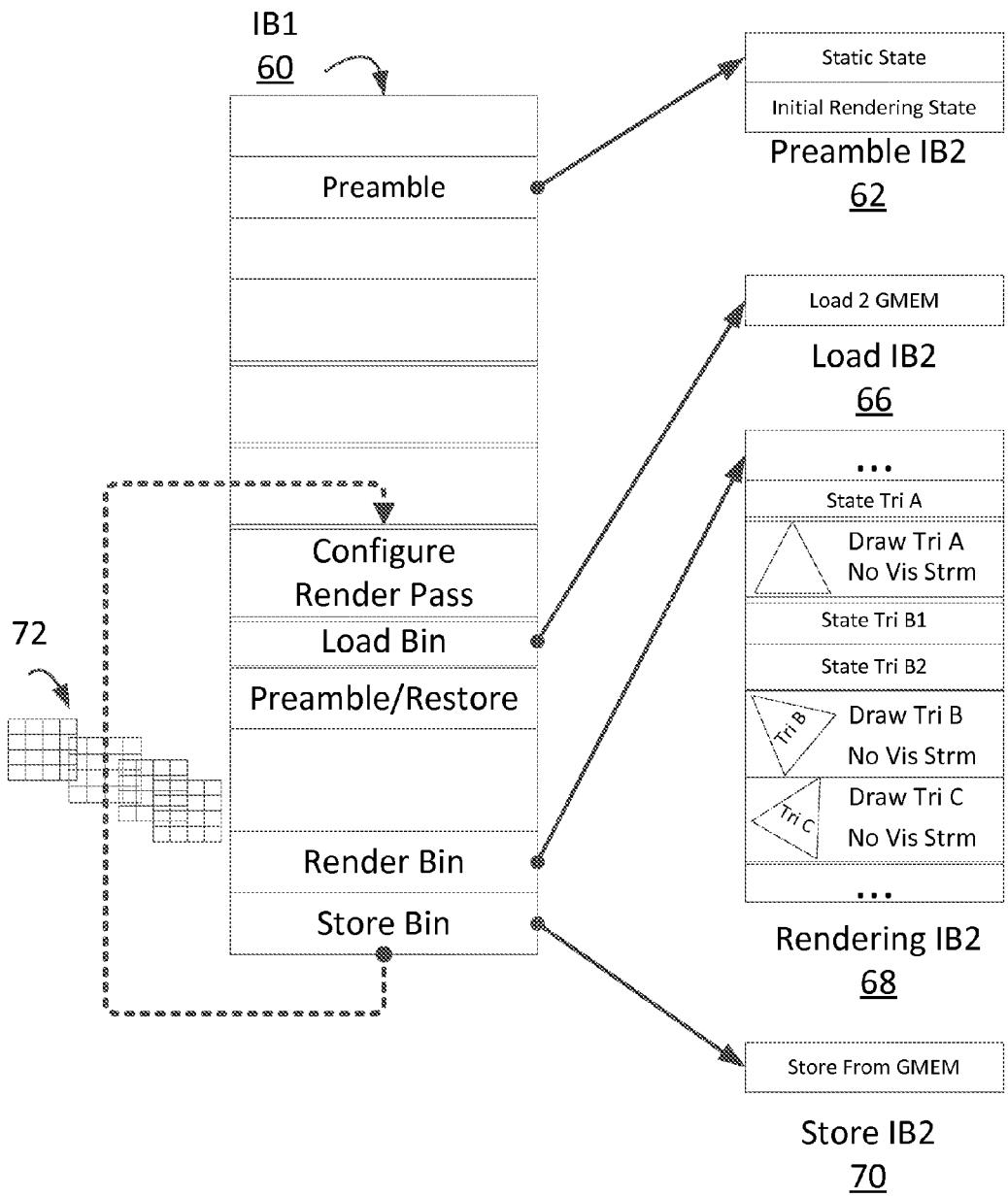
FIG. 5 is a conceptual diagram illustrating command buffers for a binning rendering mode using "software" binning.

FIG. 5 is a conceptual diagram showing an example command structure for rendering a scene using a binning rendering mode using "software" binning Level 1 indirect buffer (IB1) 60 contains a series of execution commands for directing GPU 12 to perform the various steps of graphics memory pipeline 30. Each execution command in IB1 60 is essentially a pointer into one or more level 2 indirect buffers (IB2) that contain commands for various aspects of the rendering pipeline. In this way, a two or more level structure is established for executing the graphics rendering pipeline. GPU 12 may sequentially step through each execution command in IB1 60, where each execution in IB1 60 points to a specific stack of commands stored in an IB2. IB1s and IB2s may be memory that is on-board GPU 12 or may be external memory to GPU 12, such as system memory 10.

The preamble execution command in IB1 60 points to a preamble IB2 62 that contains preamble commands that are executable by GPU 12. For example, preamble IB2 62 may include commands that initializes that static state of GPU 12 and sets the initial rendering state of GPU 12. The static state of GPU includes settings that do not change based on the particular application. The rendering state, on the other hand, includes GPU settings that may change based on the particular application (e.g., an OpenGL application vs. a Direct X application). After the commands in the preamble IB2 are completed, control returns to IB1 60 to perform the next execution command.

The next execution command in IB1 60 configures the render pass for the rendering mode being employed. Again, in the example of FIG. 5, the rendering mode is the binning rendering mode using software binning Next, the load bin execution command in IB1 60 points to the commands in load IB2 66. For software binning, data for a particular bin is loaded into GMEM 14 (Load 2 GMEM). Control then passes back to IB1 60 and the render bin execution command points to commands in the rendering IB2. Rendering IB2 68 consists of a series of state commands and draw commands for drawing the triangles in the loaded bin. Each draw command instructs GPU 12 to draw the triangle in accordance with a graphics processing pipeline 30 (e.g., including a geometry processing state 34, a rasterization state 36, and/or a pixel processing pipeline 38) established by the commands and/or GPU hardware. As shown in rendering IB2 68, each of the draw commands indicates that no visibility stream is used to determine if the specific triangles are actually visible in the bin. Visibility streams are generated in a binning rendering mode that uses "hardware" binning, and will be discussed in more detail with reference to FIG. 6. The state commands in rendering IB2 68 affect the behavior of the graphics processing pipeline executed by GPU 12. For example, state commands may change the color, polygon mode (e.g., points instead of solids or lines), blending (on/off), depth testing (on/off), texturing (on/off), culling, clipping, and other logical operations. As shown in rendering IB2 68, state commands may be issued on a per triangle (or per primitive) basis. That is, the command "State Tri A" may affect the behavior of GPU 12 when drawing triangle A, while the "State Tri B1" and "State Tri B2" commands may affect the behavior of GPU 12 when drawing triangle B. The "State Tri B1" and "State Tri B2" commands merely indicate that multiple state commands may be executed for each triangle.

After all command have been executed in rendering IB2 68 (e.g., after all triangles have been drawn), control returns to IB1 60. The store bin execution command may include a pointer to a store IB2 70 that includes a command to store the rendered bin from GMEM 14 into memory (e.g., frame buffer 15). The render pass (e.g., the execution commands from configure render pass to store bin as shown in IB1 60) are then repeated for each bin 72 for one or more frames.

Figure 6:
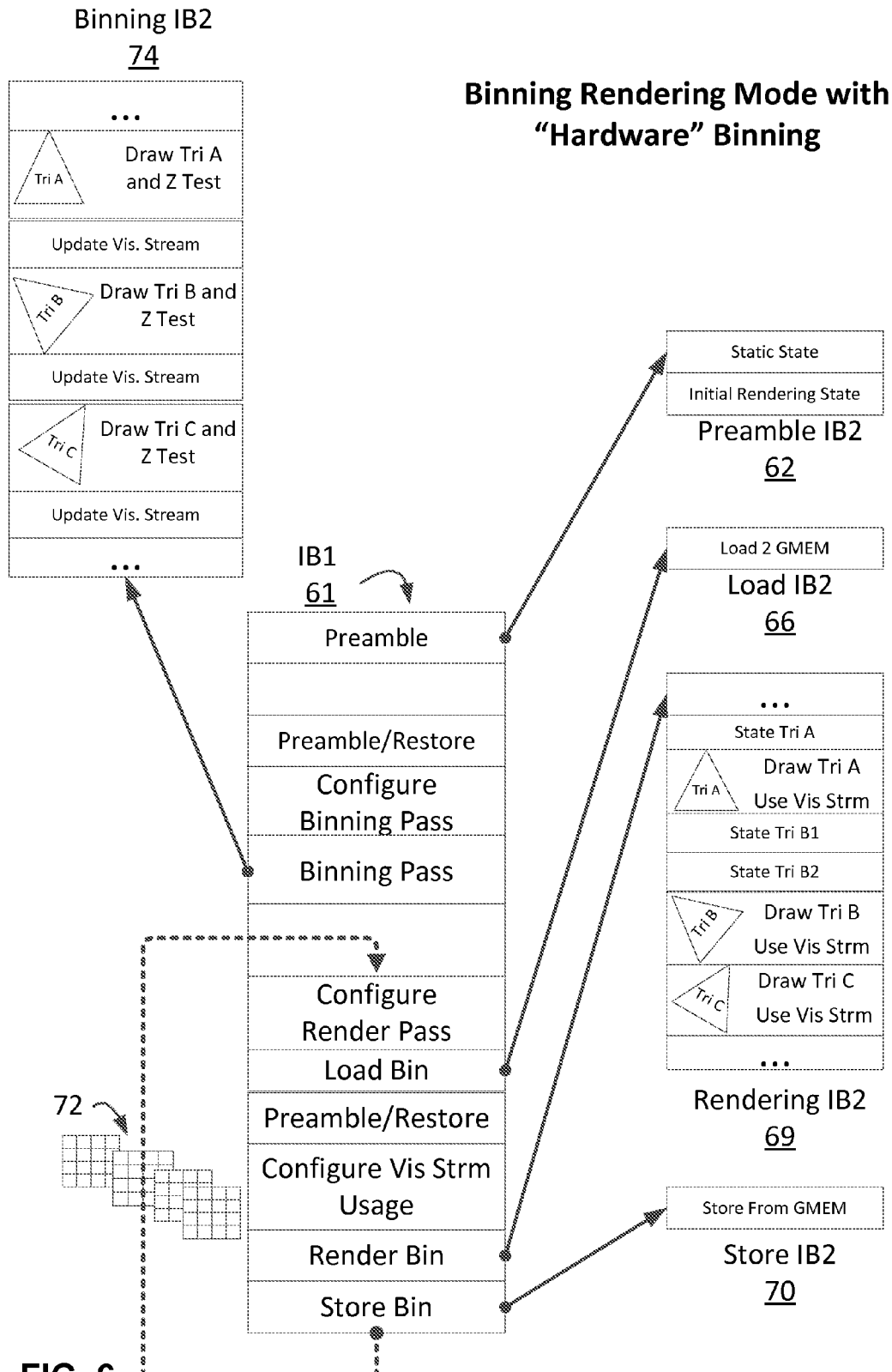
FIG. 6 is a conceptual diagram illustrating command buffers for a binning rendering mode using "hardware" binning.

FIG. 6 is a conceptual diagram showing an example command structure for rendering a scene using a binning rendering mode using "hardware" binning. The execution commands in IB1 61 are similar to those of IB1 60 of FIG. 6 with the exception of commands related to a "binning" pass. A "binning" pass is used to generate a visibility stream that indicates whether or not specific triangles in the bin are actually visible in the final rendered scene. For example, some triangles may be behind another triangle in the scene and will not be visible in some scenarios (e.g., when the triangle in front is opaque or when no blending is used). Before rendering bins 72, IB1 61 may include a binning pass execution command that points to commands in binning IB2 74. Binning IB2 74 includes commands that cause GPU 12 to perform a simplified version of a graphics pipeline (e.g., a simplified version of rendering IB2 69), but adds the step of updating a visibility stream for each triangle in the bin based on a depth test (Z test) that determines whether or not the triangle is visible in the final rendered scene.

The goal of the binning pass is to identify triangles that intersect the current bin. As such, only the position of the vertices of the triangle need to be determined to identify if a triangle intersects a particular bin. The binning pass utilizes a simplified vertex shader that only includes instructions that affect the position of the vertices. For example, color instructions, texture coordinates and other instructions that do not affect the position of triangle vertex may be removed from the simplified vertex shader used for the binning pass. The binning pass also uses coarse rasterization, rather than fine rasterization, to determine an approximate depth of each triangle. Coarse rasterization calculates a depth value at a lower precision (e.g., using a lower number of bits) than fine rasterization. Only approximate depth values are necessary to determine if a triangle is visible in the bin. Pixel shaders are not used in the binning pass.

The binning pass then utilizes a depth test on the coarse depth values to determine if a triangle is visible in the bin relative to other triangles in the bin. Based on this depth test, a visibility stream is updated. The visibility stream may be a string of bits that indicates whether or not a specific triangle in the rendered bin is visible (e.g., 1 indicates a triangle is visible, 0 indicates a triangle is not visible).

The commands in rendering IB2 69 are similar to those of rendering IB 68 in FIG. 5, but for the use of the visibility stream. Draw commands (e.g., Draw Tri A, Draw Tri B, Draw Tri C, etc.) in the rendering IB2 69 may use the visibility stream generated by the binning pass to determine whether or not it is necessary to draw a specific triangle. For example, drawing may be skipped for triangles indicated as not visible by the visibility stream.

As opposed to rendering a frame bin by bin, as in a binning rendering mode, a direct rendering renders an entire frame in one pass through a graphics pipeline. Direct rendering, typically utilizes slower system memory when executed in binning-based architectures with a limited amount of graphics memory.

Figure 7:
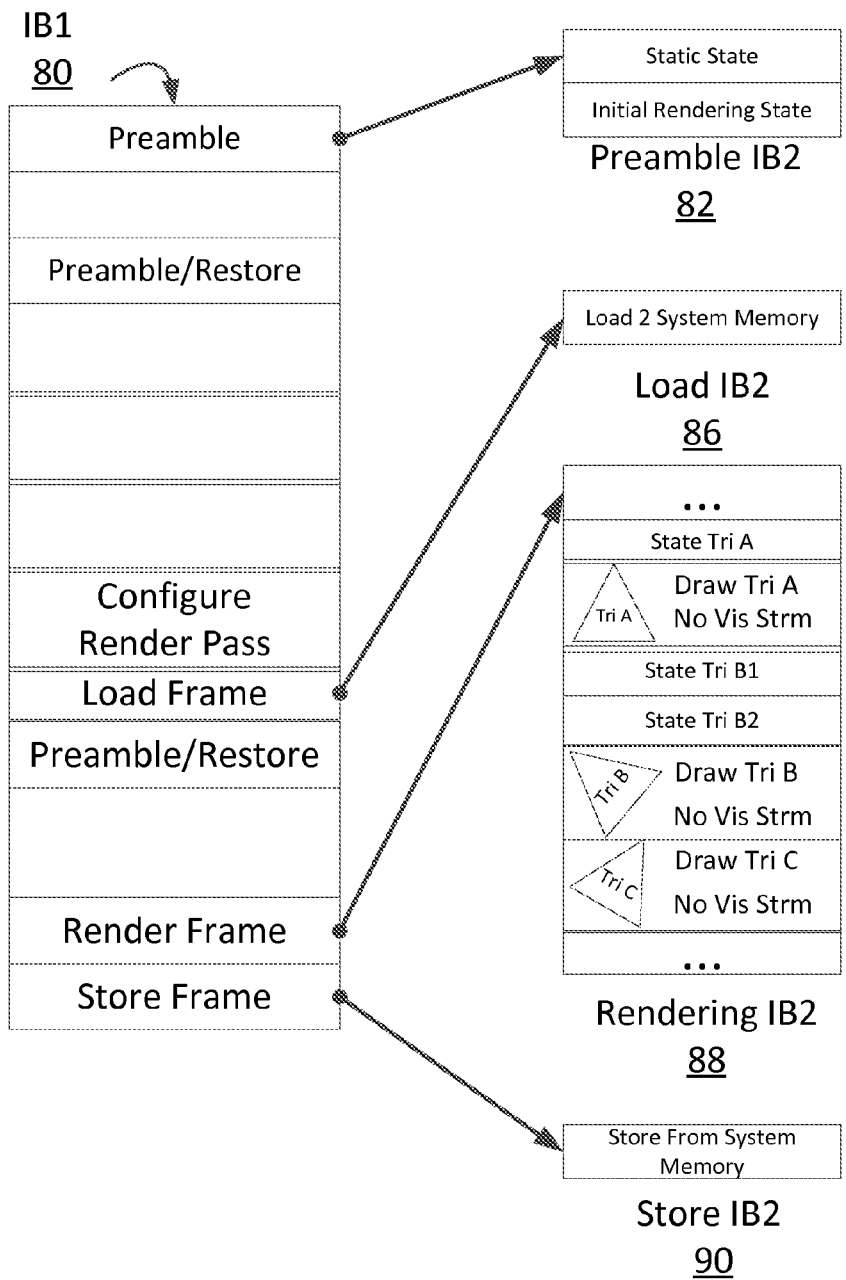
FIG. 7 is a conceptual diagram illustrating command buffers for a direct rendering mode.

FIG. 7 is a conceptual diagram showing an example command structure for rendering a scene using a direct rendering mode. The commands for a direct rendering mode are similar to those for software binning in FIG. 5, but instead of rendering on a bin by bin basis, an entire frame is rendered in one pass. For example, the execution commands in IB1 80 are similar to those in IB1 60, but rather than loading, rendering and storing bins, the execution commands in IB1 80 point to commands in respective IB2s that load, render, and store frames. More specifically, the load frame execution command in IB1 80 points to load IB2 86 that includes a command to load data for a frame to system memory (Load 2 System Memory). The commands in IB1 80 may include preamble, preamble/restore, configure render pass, load frame, render frame, and store frame. The render frame execution command in IB1 80 points to rendering IB2 88 that contains instructions causing GPU 12 to draw the primitives in the frame. Like software binning, rendering in a direct rendering mode does not make use of a hardware binning pass or a visibility stream. Any drawing commands in rendering IB2 88 (e.g., Draw Tri A, Draw Tri B, Draw Tri C) would utilize system memory to store the rendered triangles. The store frame execution command points to store IB2 90 that contains instructions (Store From System Memory) to store the rendered frame from system memory to another memory (e.g., frame buffer 15).

The preamble execution command in IB1 80 points to preamble IB2 82 that contains instructions for establishing the static state and the initial rendering state of GPU 12. These commands act similarly to the commands in preamble IB2 62 of FIG. 6, but setup the rendering state for a direct rendering mode rather than a binning rendering mode.

In accordance with techniques of this disclosure, before an application (e.g., software application 24 of FIG. 2) begins rendering a scene, a graphics driver (e.g., graphics driver 7) executing on one or more processors (e.g., CPU 6) makes a determination a rendering mode (e.g., a determination between binning rendering and direct rendering) based on heuristic data concerning the desire rendering pass. In some techniques, heuristic data concerning a current rendering pass may be gathered from previous rendering passes. However, this technique may not always be an optimal way to determine the rendering mode, as the application may switch rendering techniques before rendering a new scene. As such, this technique may lead to inefficient rendering until enough new data has been accumulated to switch to the proper rendering mode.

Additionally, heuristic data concerning past renderings may not always provide for the most optimal rendering mode for the current scene if the current scene is different from previous scenes. For example, an application that would optimally use rapidly changing rendering modes may lead to many false predictions using such heuristic analysis. Ideally, the graphics driver can determine the rendering load for a given render target and make a rendering mode determination immediately. This disclosure proposes techniques for a more optimal determination of a rendering mode and techniques for switching between rendering modes.

The following techniques are applicable for a graphics processing system using any graphics application program interface (API), and in particular, are suitable for graphics APIs that utilize binning rendering. Examples of such APIs include Microsoft's DirectX9 (DX9), DX10, and DX11, as well as open source graphics APIs, such as OpenGL and OpenGL ES.

Figure 8:
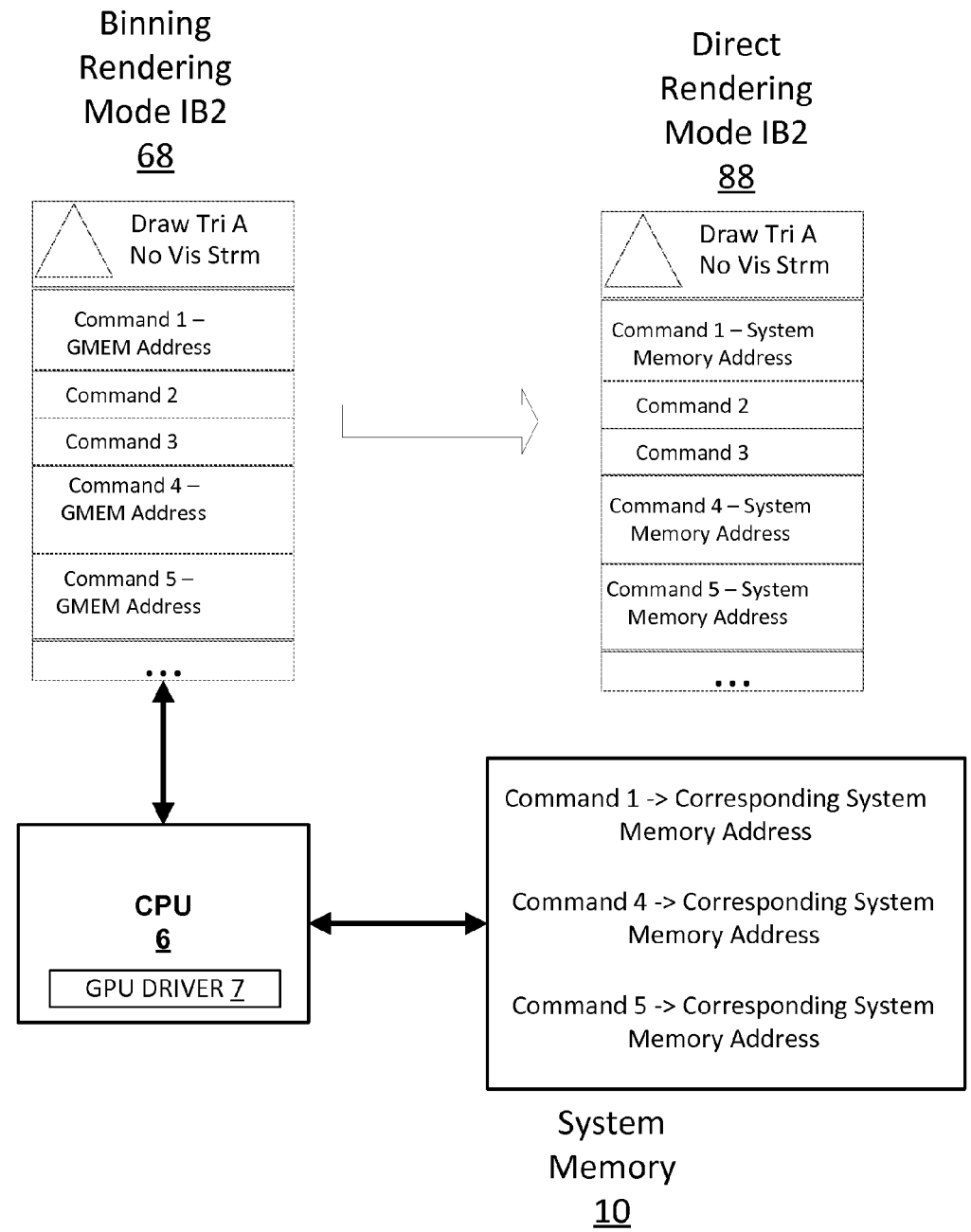
FIG. 8 is a conceptual diagram illustrating rendering command patching according to one example of the disclosure.

FIG. 8 is a conceptual diagram illustrating rendering command patching according to one example of the disclosure. Initially, a graphics processing system (e.g., computing device 2 of FIG. 1) initially assumes a particular application more optimally renders to the current render target (e.g., one or more frames) in binning mode. The selection of a particular rendering mode (e.g., binning or direct rendering) may be handled by graphics driver 7. When binning is enabled, graphics driver 7 batches all of the load, store, rendering and block transfer (BLT) commands for a given render target until it is required to flush them. In this context, flush means sending any rendering commands batched by the driver to the hardware (e.g., GPU 12). Commands for loading, storing, rendering and BLTs may be stored in separate buffers (e.g., separate IB2 buffer). For example, the rendering commands may be stored in binning rendering mode IB2 68.

Rendering commands in the binning rendering mode uses special addresses that are written to certain registers so that the fast graphics memory (GMEM) may be accessed. Since graphics driver 7 initially assumes binning is enabled for all rendering, every register which has a choice of GMEM versus system memory will use the GMEM address. Binning rendering mode IB2 68 in FIG. 8 shows a series of commands associated with drawing a triangle (Draw Tri) where commands 1, 4 and 5 utilize a GMEM address.

When the rendering is to be flushed, graphics driver has access to all rendering commands about to be performed. In accordance with techniques of this disclosure, graphics driver 7 may be configured to analyze the rendering commands, and may take into consideration one or more rendering characteristics (i.e., heuristic data concerning the rendering pass). Such rendering characteristics may include the size and type of the render target, an indication of whether depth testing is enabled, the complexity of the shaders used, the number of primitives drawn, the number of texture reads, the sizes of any textures read, and/or the micro-tiling mode of all surfaces in use.

For example, based on the size of a render target, GPU driver 7 may determine whether the overhead of binning (e.g., the time to perform load/store cycle to GMEM plus the binning pass) will be offset by positive effects of binning. For example, a small render target (e.g., 16×16) may execute faster in direct rendering mode, even when saving to system memory.

As another example, a graphics pipeline that does not utilize depth testing may not utilize advantages of binning rendering mode. Typically, when binning is not used, a depth test has to be applied to read an existing depth value, perform a test, and then write the new depth value back to the buffer in system memory. With binning, the depth test process is done in GMEM, which makes it "free" (i.e., very fast, with minimal overhead time). As such, when there is no depth testing enabled for a particular graphics pipeline, the binning rendering mode would not provide any memory bandwidth saving related to depth testing. As such, when depth testing is disabled or not being used, GPU driver 7 may determine that direct rendering mode is preferred.

As another example, the binning rendering mode provides the most benefit when there is depth complexity (e.g., primitives at various depths) and overlap between triangles. When the number of primitives drawn is small, the benefit from a binning rendering mode may also be small. As such, GPU driver 7 may determine that direct rendering mode is preferred when a small number primitives is to be drawn. Likewise, GPU driver 7 may determine that binning rendering mode is preferred when a large number of primitives is to be drawn.

As another example, when performing texture, extra stores and reads to and from system memory has a negative effect on system memory bandwidth. As such, when texturing, binning rendering mode provides quicker access to memory (i.e., most stores and reads are performed with faster GMEM). The number and frequency of texture operations in a scene to drawn might nullify the gain from the binning rendering mode. That is, fewer texture operations may suggest that binning rendering mode will provide fewer benefits, and that direct rendering mode should be used instead.

The outcome of the analysis of the rendering commands may be computed as a "score," which may take into account one or more of the various characteristics discussed above, e.g., on a weighted or non-weighted basis. If this score is below a given threshold, the direct rendering mode is used. If this score is above a given threshold, the binning rendering mode is used. As such, this technique provides for a just-in-time (JIT) analysis of a current render target to determine the current rendering mode. Heuristic analysis of past rendering passes is not needed. However, heuristic analysis of past rendering passes may be used instead or in conjunction with analysis of a current render target. For example, the JIT analysis of the current rendering mode may be used as an indicator that the rendering mode determined from heuristic analysis of accumulated statistics of past renderings is invalid.

According to another example of the disclosure, the determination of a rendering mode (e.g., a determination between a binning rendering mode and a direct rendering mode) may be made using an overdraw tracker in a graphics processing system utilizing "hardware" binning.

Figure 9:
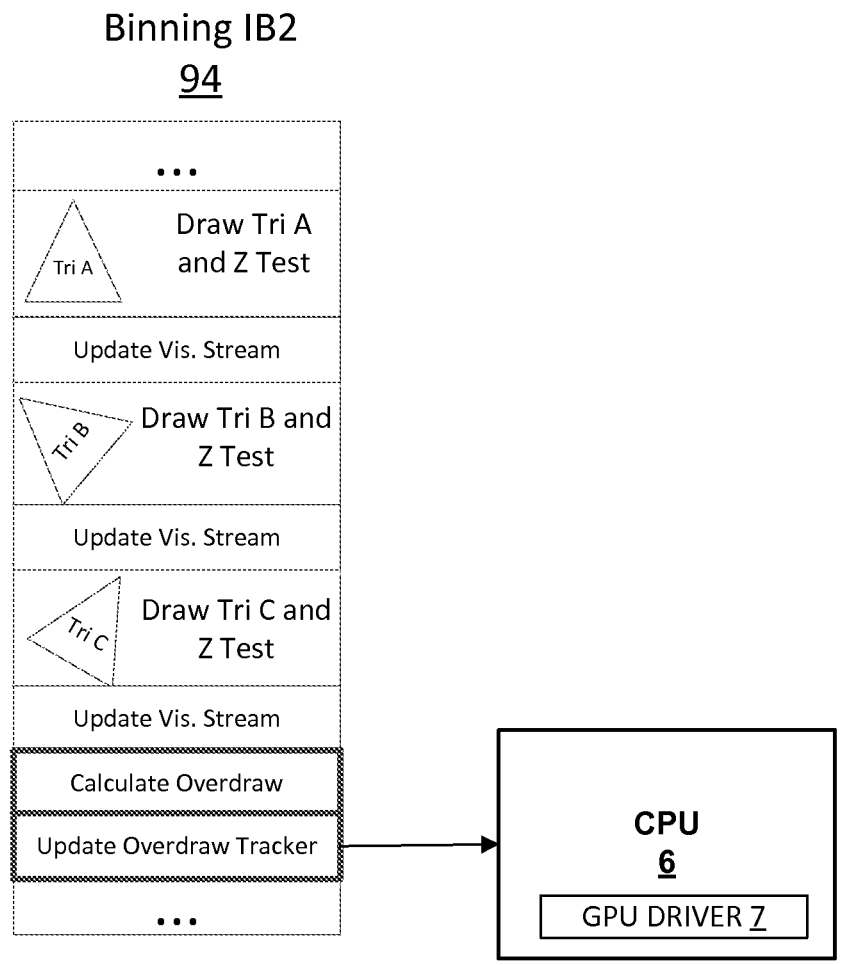
FIG. 9 is a conceptual diagram illustrating overdraw tracking according to one example of the disclosure.

FIG. 9 is a conceptual diagram illustrating overdraw tracking according to one example of the disclosure. The binning rendering mode is most effective, relative to a direct rendering mode, when there is a high amount of overdraw. Overdraw occurs when there are several graphics primitives that overlap. Drawing all of such primitives may not be efficient, as portions of some primitives may not be visible in the final scene (e.g., they are behind another opaque primitive). "Hardware" binning may be used to reduce overdraw in certain tiles of a frame (e.g., by producing a visibility stream as described above).

In graphics architectures that utilize binning, there are typically 2 phases: 1) a binning phase which sorts primitives into screen aligned bins based on their transformed vertex positions and 2) a rendering phase where each of these bins (i.e., the primitives in the bin) are rendered. In addition to the sorting step, some graphics processing architectures also generate a visibility stream per primitive and a coarse grained depth (Z) value associated with the region (e.g., in so-called "hardware" binning) Note, however, that this "hardware" binning may not produce direct information about the distribution of the primitives in the bins and the associated overdraw. This disclosure proposes adding an overdraw tracker at the same granularity as that of the coarse grained Z rasterizer (i.e., the commands in binning IB2 94). For example, commands (e.g., "calculate overdraw" and "update overdraw tracker") may be added to binning IB2 94 that instructs GPU 12 to calculate an amount of overdraw for each bin and to update an overdraw tracker based on the calculated amount of over draw.

This "overdraw" may be an integer value per-region (where the region may be a pixel, a portion of a bin, a bin, or a plurality of bins) that represents the overlap between primitives rasterized in that region, and hence the benefit of using binning rendering. Graphics driver 7 may have access to the overdraw number and may use the overdraw number to make rendering mode determinations. This technique can then be extended to aggregate this value to all regions in a bin, and further to all bins in a scene. This allows a software application and/or driver (e.g., graphics driver 7 to make an immediate determination (when compared against other heuristics) on whether binning rendering will be beneficial. In addition, these techniques can also be used as a debug tool to visualize regions of activity in a complex rendering scenario.

Figure 10:
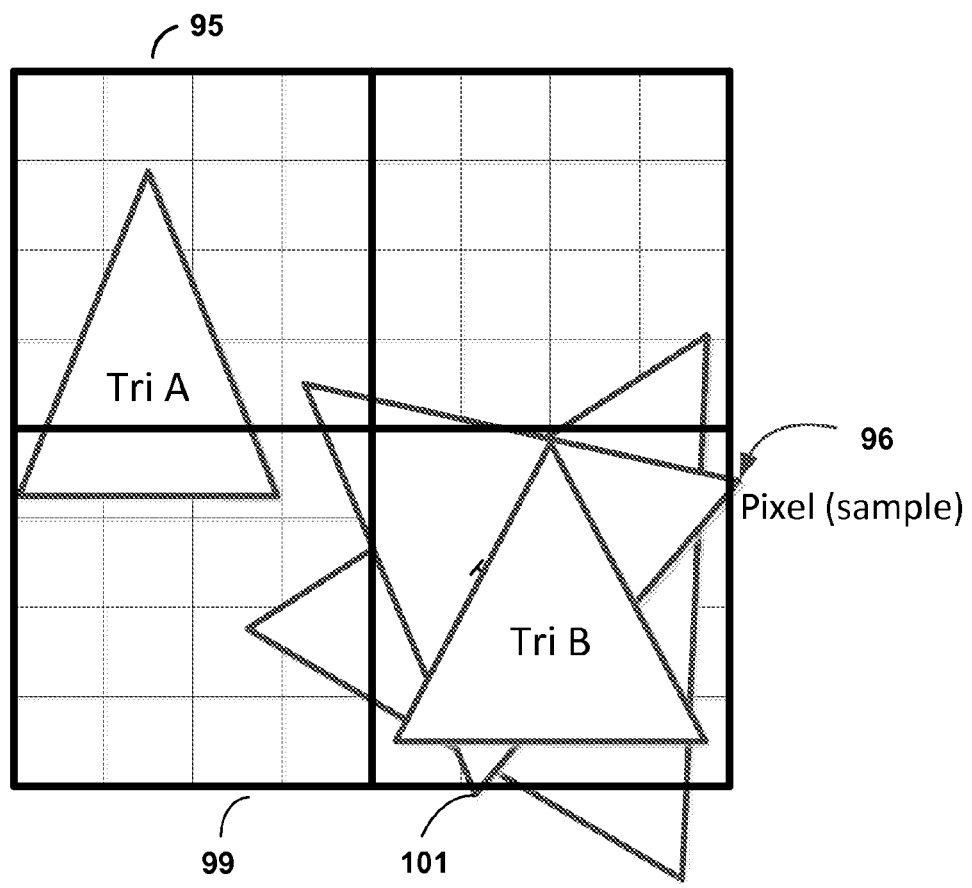
FIG. 10 is a conceptual diagram illustrating overdraw in four bins according to one example of the disclosure.

FIG. 10 illustrates one example of calculating overdraw in four 16×16 bins. In this example, an "overlap" is first calculated for each pixel. Overlap is defined as the number of primitives greater than 1 that touch a pixel. All pixels in bins 95 and 99 would have an overlap score of 0, while pixel 96 of bin 101, for example, would have an overlap score of 1, since two triangles are in that pixel. The "overdraw" number may be defined as the sum of the overlap scores for a bin divided by the total number of pixels in the bin (e.g., Overdraw=Sum of overlap per pixel/Number of pixels). In the example shown in FIG. 10, bin 101 would have an overdraw number of 30/16, while both bins 95 and 99 would have an overdraw score of 0. An overdraw number over a certain threshold may indicate that a binning rendering mode should be used for the region associated with the overdraw number, while an overdraw number below a certain threshold may indicate that a direct rendering mode should be used for the region associated with the overdraw number.

Returning to FIG. 8, based on the score (based on an analysis of the rendering commands and/or the overdraw tracker), graphics driver 7 determines the optimal mode. In conjunction with determining the more optimal rendering mode, graphics driver 7 may also be configured to track all binning rendering commands that utilize a GMEM address (e.g., Commands 1, 4 and 5 in the example of FIG. 8). Graphics driver 7 may store a corresponding system memory address for each of these commands (e.g., in system memory 10) so that the binning rendering commands using GMEM addresses may be altered to use system memory address. If direct rendering is determined to be the more optimal mode, graphics driver 7 may patch binning rendering mode IB2 68 to replace the GMEM addresses with system memory addresses, thus producing direct rendering mode IB2 88. In this way, rendering commands for direct rendering may be created without re-creating an entire command structure for a direct rendering mode IB2. Finally, at flush time, graphics driver 7 adds commands to the IB1 (e.g., IB1 80 of FIG. 7) to execute a BLT IB2 and the rendering IB2 (in this case, the rendering IB2 altered to use system memory addresses) and GPU 7 is signaled to start executing the IB1.

Figure 11:
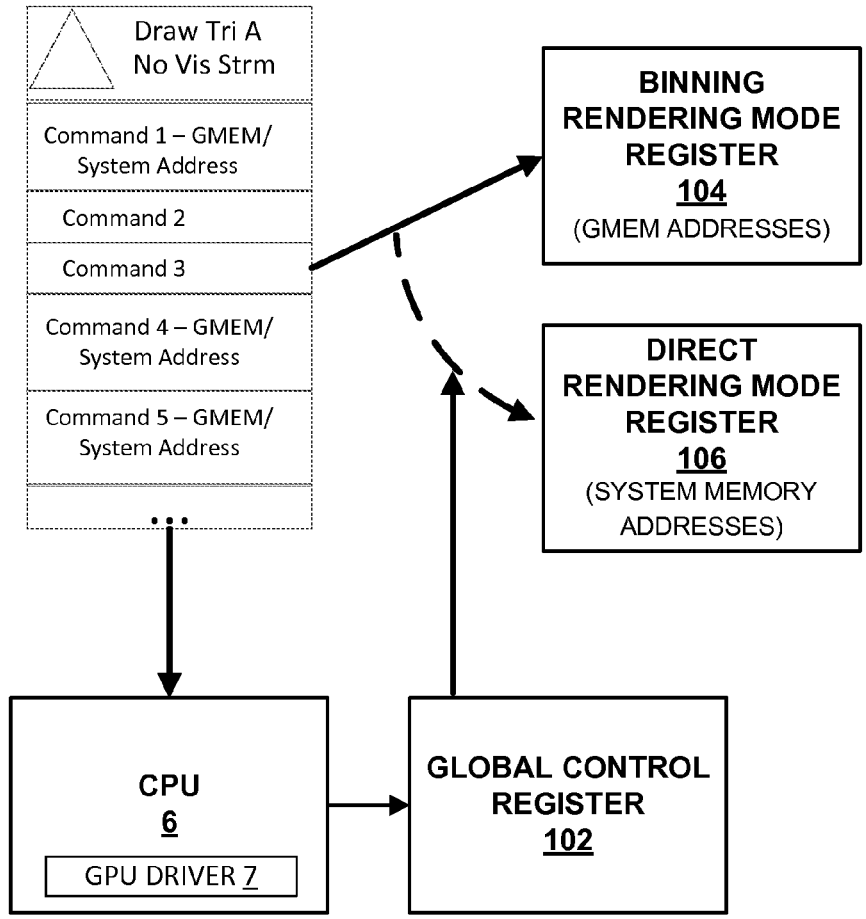
FIG. 11 is a conceptual diagram illustrating rendering mode selection according to one example of the disclosure.

In another example of this disclosure, each register used for rendering may be implemented in hardware. FIG. 11 is a conceptual diagram illustrating rendering mode selection according to this example of the disclosure. A global control register 102 may be used to control which set of registers is used for a given rendering mode (e.g., binning rendering mode register 104 or direct rendering mode register 106). Binning rendering mode register 104 may handle destination surface information (i.e., bins), address registers for GMEM, and visibility stream usage (for hardware-based binning rendering). Direct rendering mode register 106 will include the addresses to system memory. Global control register 102 controls which version of the above registers is used to populate the commands in rendering IB2 118, for example, based on the JIT analysis of rendering mode, as described above. Graphics driver 7 may control global control register 102 to select binning rendering mode register 104 or direct rendering mode register 106. Rather than patching the IB2 with software, as described above, this technique uses hardware registers. Global control register 102 may be in IB1.

Figure 12:
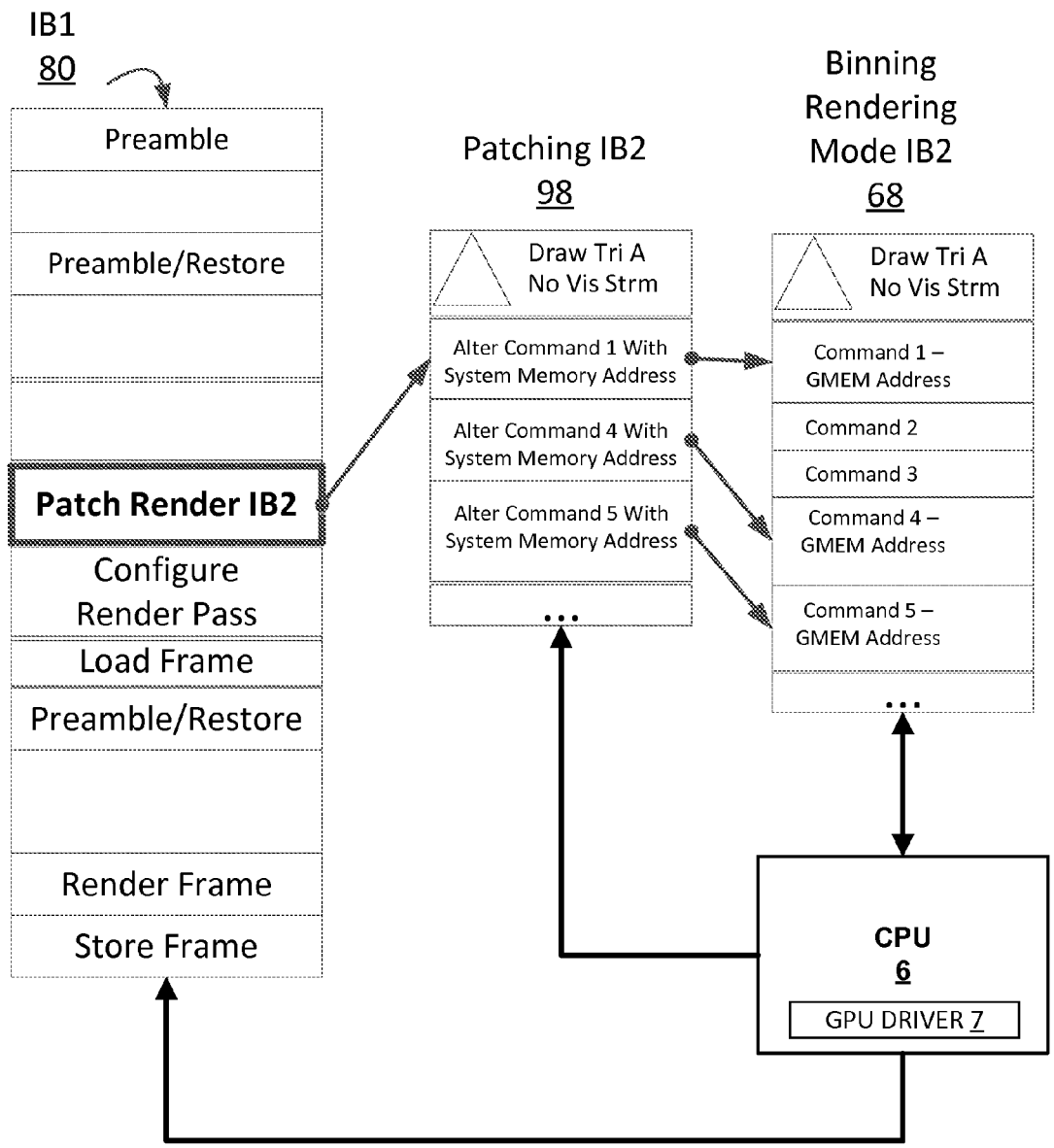
FIG. 12 is a conceptual diagram illustrating rendering command patching according to another example of the disclosure.

In another example of the disclosure, techniques for patching a command buffer are proposed. FIG. 12 is a conceptual diagram illustrating rendering command patching according to this example of the disclosure. The proposed techniques of this example may be used for patching a command buffer when switching from a binning rendering mode to a direct rendering mode. However, the following techniques may be utilized in any situation where patching a command buffer is desired. For example, commands may be patched to support virtualization of graphics memory, to change MIP level of resource level-of-detail (LOD) in lower MIPs, or to run a correctness scanner before executing a command buffer. The CPU cycles needed to patch a command buffer to switch from binning rendering mode into direct rendering mode can be costly in certain scenarios. This example aims to reduce the CPU overhead.

In general, this technique provides a way for graphics driver 7 to use GPU 12 (instead of GPU driver 7) to patch a command buffer, thereby minimizing CPU overhead. In the example of FIG. 8, if graphics driver 7 is to switch between binning and direct rendering, graphics driver 7 tracks and patches all of the IB2 commands prior to adding execution commands to an IB1. This example proposes that instead of building a patch list (e.g., the patch list shown in system memory 10 of FIG. 8), graphics driver 7 builds a separate patching IB2 98 that contains write commands that alter a command (e.g., any general operation command) in another IB2. For example, the destination of the write commands may be the locations in a binning rendering mode IB2 68 which need to be altered to use system memory addresses in the case that a direct rendering mode is selected by graphics driver 7. When graphics driver 7 is ready to flush the commands, it has the option of executing the commands in the "patching IB2" to enter a direct rendering mode, or skipping the patching IB2 and continuing in binning mode. Graphics driver 7 may effect patching IB2 98 to be executed by adding an execution command (Patch Render IB2) to the execution commands in IB1 80. In this way, GPU 12 will execute the patching commands in IB2 98 before executing the rendering commands in IB2 68. As such, GPU 12 itself makes the patches to the rendering IB2 68 to effect a rendering mode switch, rather than having CPU 6 make the patches.

Figure 13:
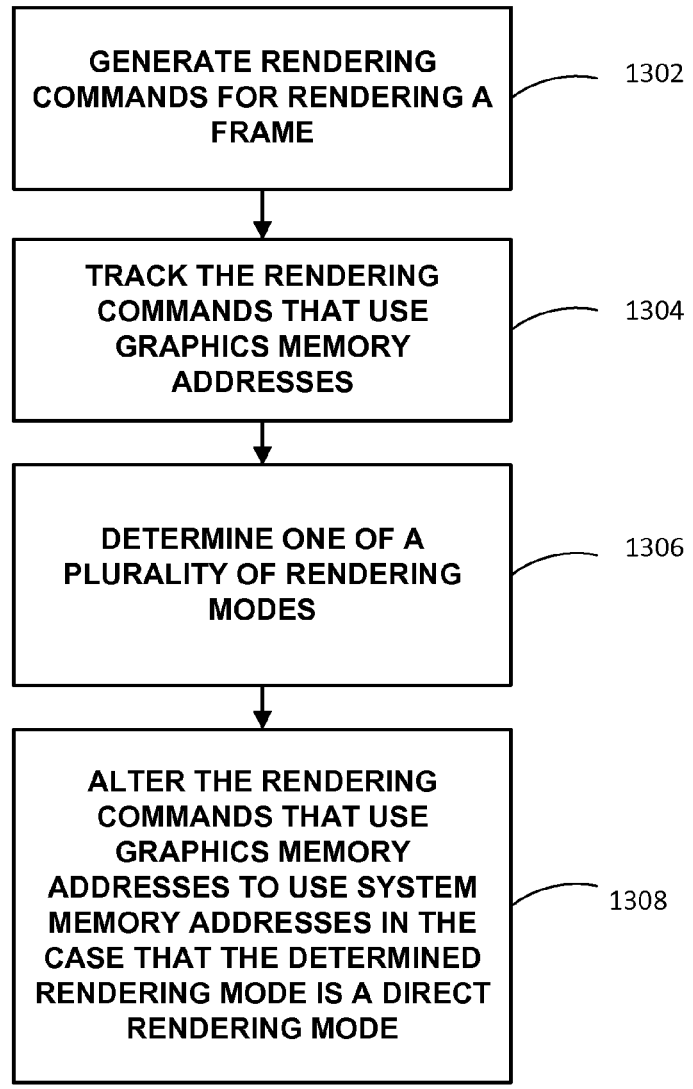
FIG. 13 is a flowchart illustrating a method according to one example of the disclosure.

FIG. 13 is a flowchart illustrating a method according to one example of the disclosure. The method of FIG. 13 may be performed by CPU 6, GPU 12, and/or any other hardware, firmware, software element, or combination thereof, residing on computing device 2. CPU 6 may be configured to generate rendering commands for rendering a frame, wherein the rendering commands are for a binning rendering mode (1302). CPU 6 may be further configured to track the rendering commands that use graphics memory addresses (1304).

CPU 6 may then determine one of a plurality of rendering modes for the frame based on rendering characteristics, wherein the plurality of rendering modes includes the binning rendering mode and a direct rendering mode (1306). The rendering characteristics include at least one of size and type of a render target, depth test status, complexity of shaders, number of primitives drawn, number of texture reads, size of textures, and a micro-tiling mode. Determining one of the plurality of rendering modes may include determining one of the plurality of rendering modes based on rendering characteristics of a current frame. In another example, determining one of the plurality of rendering modes may include determining one of the plurality of rendering modes based on rendering characteristics of a current frame and previously rendered frames.

CPU 6 may then alter the rendering commands that use graphics memory addresses to use system memory addresses in the case that the determined rendering mode is a direct rendering mode (1308). In the case that the determined rendering mode is the binning rendering mode, CPU 6 would not alter the rendering commands.

CPU 6 may be further configured to store execution commands in a first buffer, and to store the rendering commands in a second buffer. The execution commands point to the rendering commands. Altering the rendering commands (1308) may include patching the second buffer to replace graphics memory addresses with system memory addresses. CPU 6 may further add an execution command to the first buffer that points to the rendering commands in the second buffer. GPU 12 may then execute the execution commands in the first buffer.

In another example, CPU 6 may be configured to store binning mode-specific information in a first register, store direct rendering mode-specific information in a second register, and utilize a global register to select between the first register and the second register based on the determined rendering mode. The binning mode-specific information includes at least one of register addresses that handle destination surface information, graphics memory addresses, and visibility stream usage, and wherein the direct rendering mode-specific information includes system memory addresses.

Figure 14:
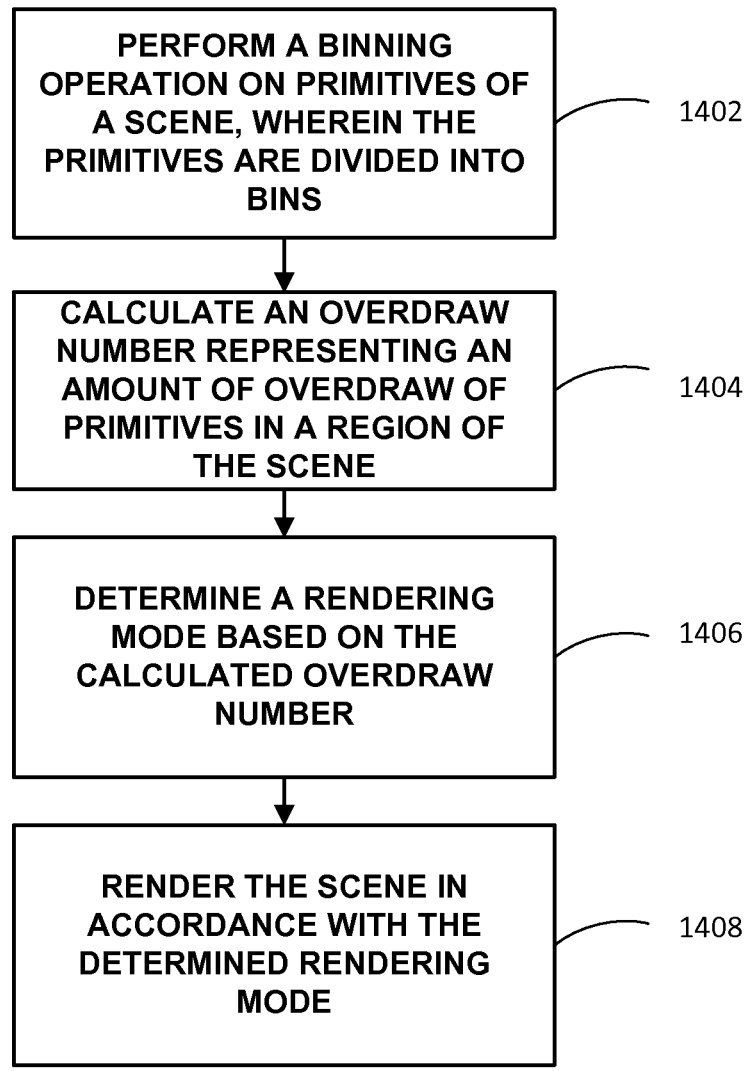
FIG. 14 is a flowchart illustrating a method according to another example of the disclosure.

FIG. 14 is a flowchart illustrating a method according to one example of the disclosure. The method of FIG. 14 may be performed by CPU 6, GPU 12, and/or any other hardware, firmware, software element, or combination thereof, residing on computing device 2. CPU 6 may be configured to perform a binning operation on primitives of a scene, wherein the primitives are divided into bins (1402), calculate an overdraw number representing an amount of overdraw of primitives in a region of the scene (1404), and determine a rendering mode based on the calculated overdraw number (1406). A binning rendering mode may be determined as the rendering mode if the overdraw number is greater than some threshold. A direct rendering mode may be determined as the rendering mode if the overdraw number is less than some threshold. GPU 12 may then render the scene in accordance with the determined rendering mode (1408).

The overdraw number may be calculated for a region of a bin, over multiple bins, and/or for the entire scene. One example technique of calculating an overdraw number (1404) for a bin may include calculating an overlap value for each pixel in a bin, summing each calculated overlap value for each pixel in the bin to produce a total overlap value, and dividing the total overlap value by a number of pixels in the bin to produce the overdraw number. The overlap value is defined as the number of primitives greater than one that touch a pixel.

Figure 15:
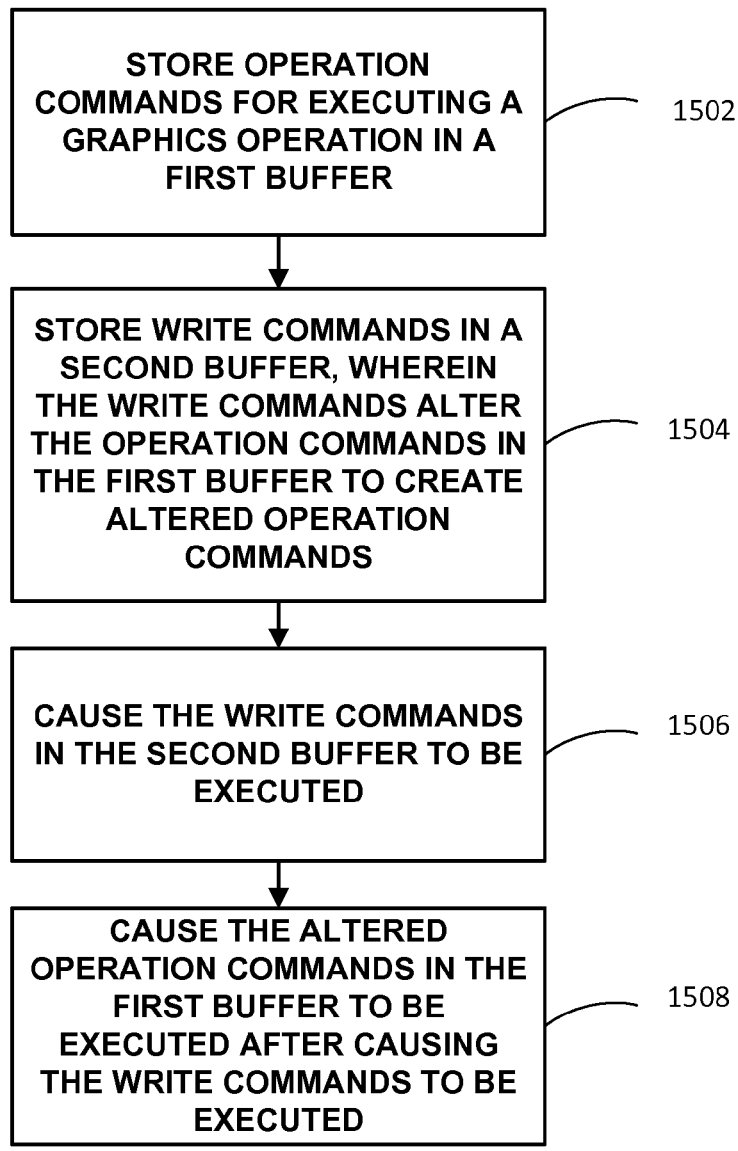
FIG. 15 is a flowchart illustrating a method according to another example of the disclosure.

FIG. 15 is a flowchart illustrating a method according to one example of the disclosure. The method of FIG. 15 may be performed by CPU 6, GPU 12, and/or any other hardware, firmware, software element, or combination thereof, residing on computing device 2. CPU 6 may be configured to store operation commands for executing a graphics operation in a first buffer (1502), and to store write commands in a second buffer, wherein the write commands alter the operation commands in the first buffer to create altered operation commands (1504). The operation commands and the write commands are executable by a graphics processor. CPU 6 may be further configured to cause the write commands in the second buffer to be executed (1506), and to cause the altered operation commands in the first buffer to be executed after causing the write commands in the second buffer to be executed (1508). In one example, the operation commands include rendering commands for a binning rendering mode, and the write commands alter the rendering commands for a binning rendering mode to rendering commands for a direct rendering mode.

Figure 16:
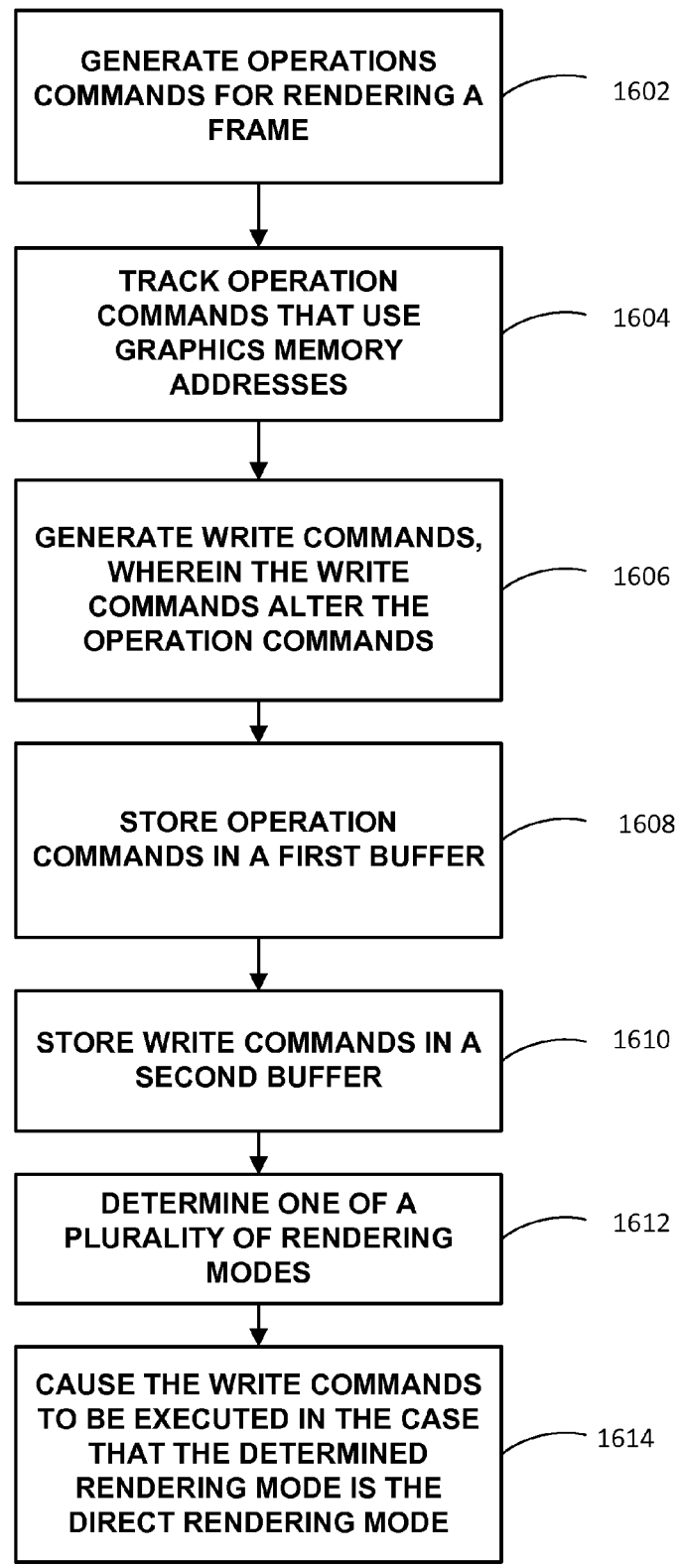
FIG. 16 is a flowchart illustrating a method according to another example of the disclosure.

FIG. 16 is a flowchart illustrating an example method that utilizes the general techniques shown in FIG. 15. The method of FIG. 16 may be performed by CPU 6, GPU 12, and/or any other hardware, firmware, or software element residing on computing device 2. CPU 6 may be configured to generate operation commands for rendering a frame, wherein the operation commands are for a binning rendering mode (1602), and to track the operation commands that use graphics memory addresses (1604). CPU 6 may be further configured to generate write commands, wherein the write commands alter the operation commands that use graphics memory addresses to be operation commands that use system memory addresses (1606). CPU 6 stores the operation commands in a first buffer (1608) and stores write commands in a second buffer (1610).

CPU may be further configured to determine one of a plurality of rendering modes for the frame based on rendering characteristics, wherein the plurality of rendering modes includes the binning rendering mode and a direct rendering mode (1612). The rendering characteristics may include at least one of size and type of a render target, depth test status, complexity of shaders, number of primitives drawn, number of texture reads, size of textures, and a micro-tiling mode. Determining one of the plurality of rendering modes may include determining one of the plurality of rendering modes based on rendering characteristics of a current frame. In another example, determining one of the plurality of rendering modes may include determining one of the plurality of rendering modes based on rendering characteristics of a current frame and previously rendered frames.

CPU 6 may be further configured to cause the write commands in the second buffer to be executed (e.g., by GPU 12) in the case that the determined rendering mode is the direct rendering mode (1614).

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, the method comprising:
   performing a binning operation on primitives of a scene;
   calculating an overdraw number representing an amount of overdraw of primitives in a region of the scene based on the binning operation, wherein calculating the overdraw number representing the amount of overdraw comprises:
   calculating an overlap value for each pixel in a bin;
   summing each calculated overlap value for each pixel in the bin to produce a total overlap value; and
   dividing the total overlap value by a number of pixels in the bin to produce the overdraw number; and
   selecting one of a plurality of rendering modes based on the calculated overdraw number.

2. The method of claim 1, further comprising:
   rendering the scene in accordance with the selected rendering mode.

3. The method of claim 1, further comprising selecting a binning rendering mode if the overdraw number is greater than a threshold.

4. The method of claim 1, further comprising selecting a direct rendering mode if the overdraw number is less than a threshold.

5. The method of claim 1, further comprising calculating the overdraw number for a region of the bin.

6. The method of claim 1, further comprising calculating the overdraw number over multiple bins.

7. The method of claim 1, further comprising calculating the overdraw number for the entire scene.

8. The method of claim 1, wherein the overlap value is defined as the number of primitives greater than one that touch a pixel.

9. The method of claim 8, wherein the primitives are triangles.

10. An apparatus configured for graphics processing, comprising:
    means for performing a binning operation on primitives of a scene;
    means for calculating an overdraw number representing an amount of overdraw of primitives in a region of the scene based on the binning operation, wherein the means for calculating the overdraw number representing an amount of overdraw comprises:
    means for calculating an overlap value for each pixel in a bin;
    means for summing each calculated overlap value for each pixel in the bin to produce a total overlap value; and
    means for dividing the total overlap value by a number of pixels in the bin to produce the overdraw number; and
    means for selecting one of a plurality of rendering modes based on the calculated overdraw number.

11. The apparatus of claim 10, further comprising:
means for rendering the scene in accordance with the selected rendering mode.

12. The apparatus of claim 10, further comprising:
means for selecting a binning rendering mode if the overdraw number is greater than a threshold.

13. The apparatus of claim 10, further comprising:
means for selecting a direct rendering mode if the overdraw number is less than a threshold.

14. The apparatus of claim 10, further comprising:
means for calculating the overdraw number for a region of the bin.

15. The apparatus of claim 10, further comprising:
means for calculating the overdraw number over multiple bins.

16. The apparatus of claim 10, further comprising:
means for calculating the overdraw number for the entire scene.

17. The apparatus of claim 10, wherein the overlap value is defined as the number of primitives greater than one that touch a pixel.

18. The apparatus of claim 17, wherein the primitives are triangles.

19. An apparatus configured for graphics processing, comprising:
a memory configured to store a scene of graphics data; and
a graphics processor in communication with the memory, the graphics processor configured to:
perform a binning operation on primitives of the scene; and
calculate an overdraw number representing an amount of overdraw of primitives in a region of the scene based on the binning operation, wherein to calculate the overdraw number, the graphics processor is further configured to:
calculate an overlap value for each pixel in a bin;
sum each calculated overlap value for each pixel in the bin to produce a total overlap value; and
divide the total overlap value by a number of pixels in the bin to produce the overdraw number; and
a processor configured to select one of a plurality of rendering modes based on the calculated overdraw number.

20. The apparatus of claim 19, wherein the graphics processor is further configured to:
render the scene in accordance with the selected rendering mode.

21. The apparatus of claim 19, wherein the graphics processor is further configured to:
select a binning rendering mode if the overdraw number is greater than a threshold.

22. The apparatus of claim 19, wherein the graphics processor is further configured to:
select a direct rendering mode if the overdraw number is less than a threshold.

23. The apparatus of claim 19, wherein the graphics processor is further configured to:
calculate the overdraw number for a region of the bin.

24. The apparatus of claim 19, wherein the graphics processor is further configured to:
calculate the overdraw number over multiple bins.

25. The apparatus of claim 19, wherein the graphics processor is further configured to:
calculate the overdraw number for the entire scene.

26. The apparatus of claim 19, wherein the overlap value is defined as the number of primitives greater than one that touch a pixel.

27. The apparatus of claim 26, wherein the primitives are triangles.

28. The apparatus of claim 19, wherein the graphics processor is in a mobile device.

* * * * *